Sept. 20, 1932. R. H. VANSANT 1,878,073
FOLDABLE DOOR
Filed Oct. 24, 1930 6 Sheets-Sheet 2

Sept. 20, 1932.   R. H. VANSANT   1,878,073
FOLDABLE DOOR
Filed Oct. 24, 1930   6 Sheets-Sheet 3

Sept. 20, 1932.  R. H. VANSANT  1,878,073
FOLDABLE DOOR
Filed Oct. 24, 1930   6 Sheets-Sheet 4
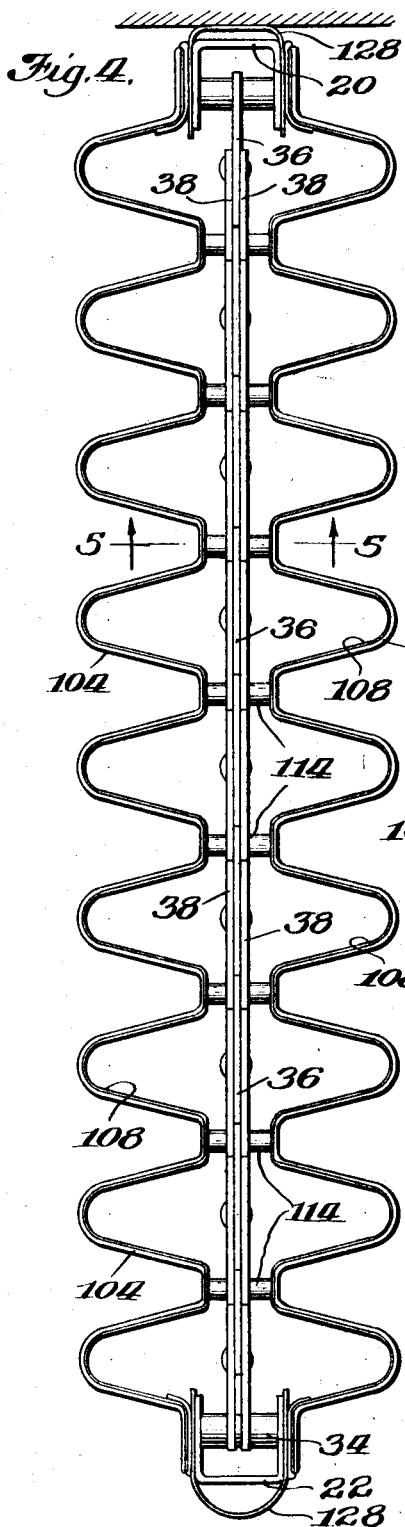
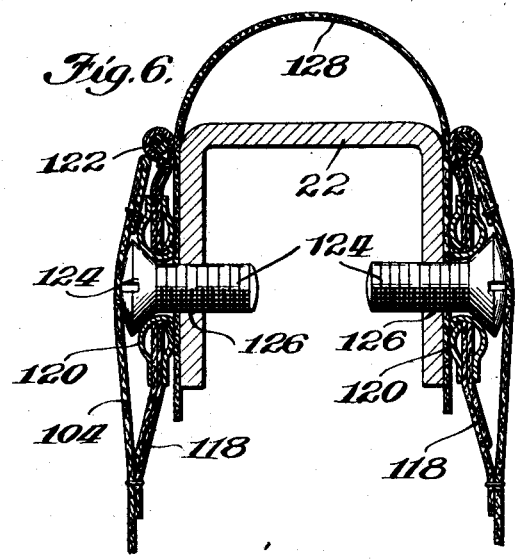
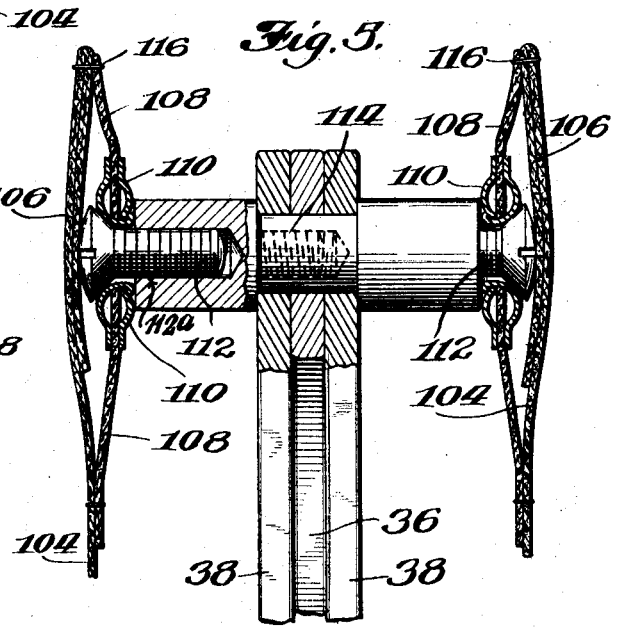
Inventor
Richard H. Vansant
By Williams, Bradbury, McCaleb & Hinkle
Attys.

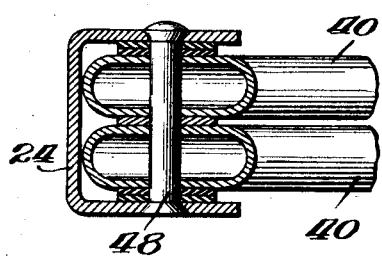
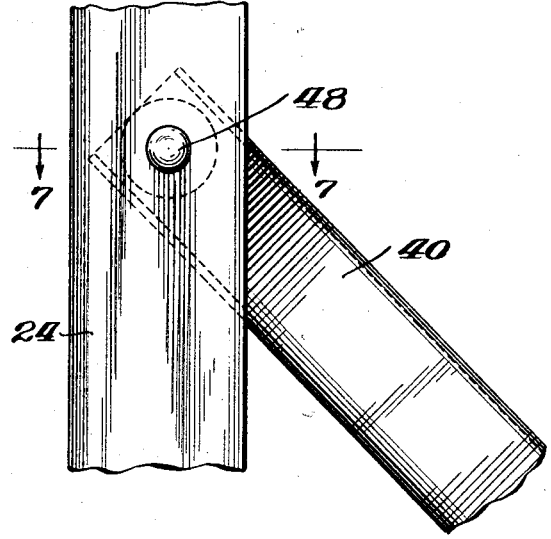
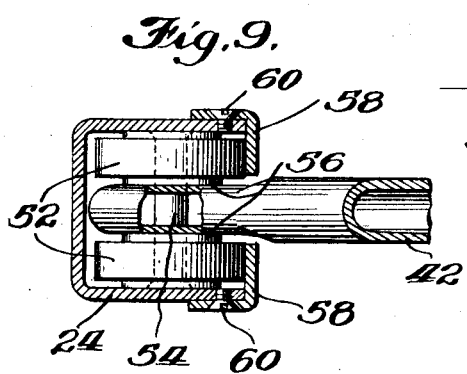
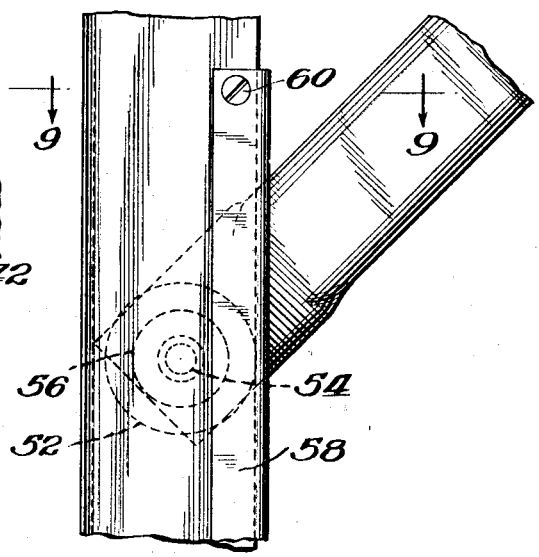
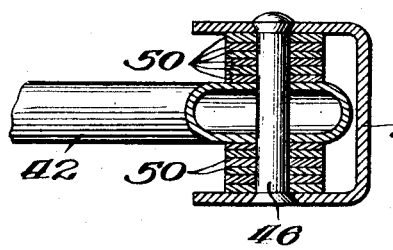

Sept. 20, 1932.  R. H. VANSANT  1,878,073
FOLDABLE DOOR
Filed Oct. 24, 1930  6 Sheets-Sheet 6
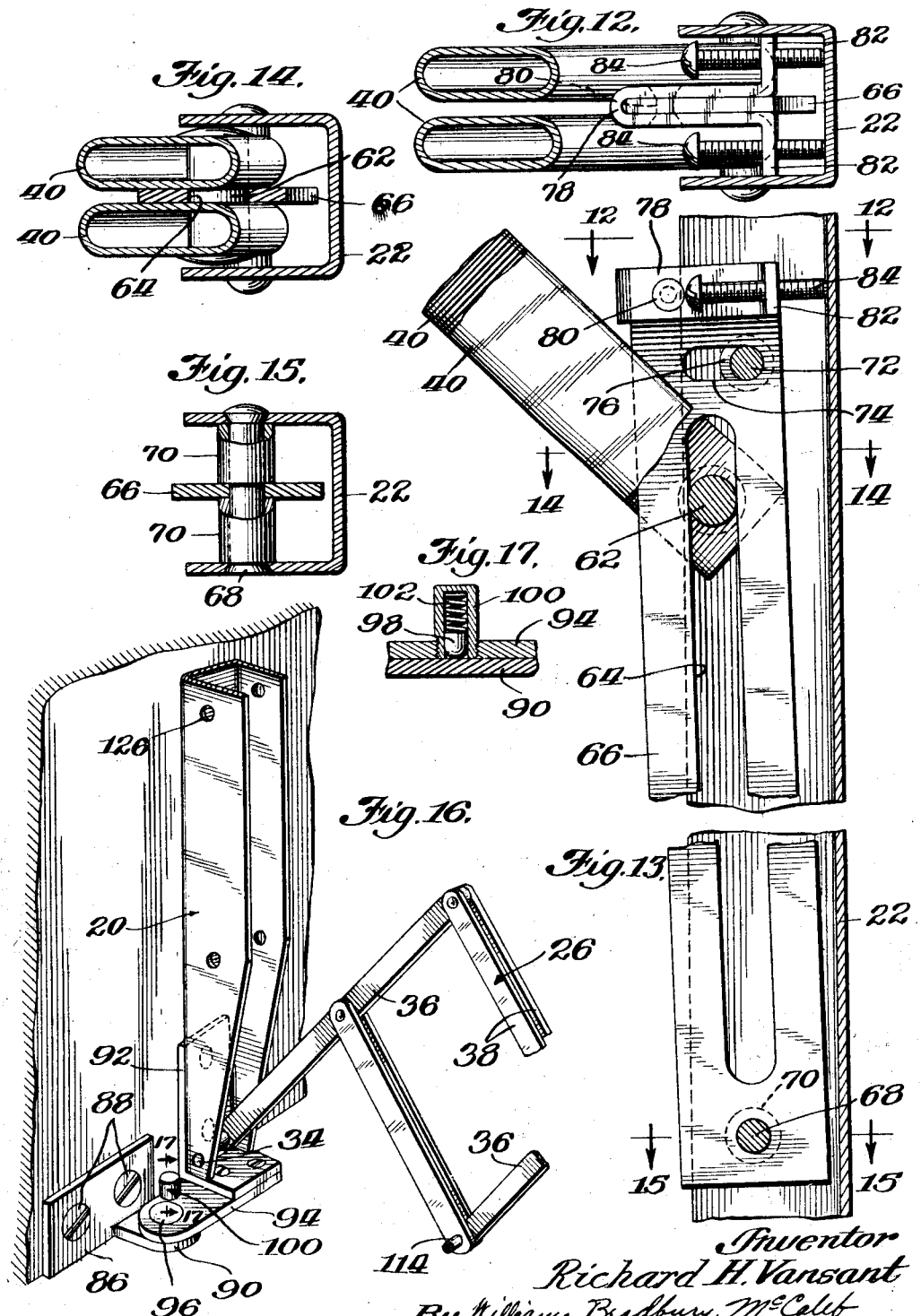
Inventor
Richard H. Vansant
By Williams, Bradbury, McCaleb & Hinkle Attys.

Patented Sept. 20, 1932

1,878,073

UNITED STATES PATENT OFFICE

RICHARD H. VANSANT, OF CHICAGO, ILLINOIS

FOLDABLE DOOR

Application filed October 24, 1930. Serial No. 490,851.

The present invention relates to foldable doors or partitions, and is particularly concerned with the provision of foldable doors adapted to be used as closures for windows, open double doorways between rooms, or single doorways. The invention is particularly adapted for use in office buildings, hotels, auditoriums, funeral parlors, apartments, homes, or the like, wherever it is desirable to provide an ornamental window closure or door which may be finished to harmonize with the color scheme of the surroundings and which may be utilized as a closure and swung outwardly and inwardly on hinges, or which may readily be folded into a very small space when it is desired to have the door removed.

One of the objects of the invention is the provision of an improved foldable door or partition of the type specified, provided with an ornamental exterior covering concealing the frame mechanism of the door from view.

Another object of the invention is the provision of a foldable door or partition which is provided with an improved framework for supporting an outer decorative covering.

Another object of the invention is to provide an improved mode of attachment for the covering whereby the covering may be easily and quickly removed and a different covering substituted therefor.

Another object is the provision of an improved mode of attachment for coverings of doors of the class described, by means of which the attaching devices are concealed but are readily accessible for convenience in removing the covering, to substitute another covering, or to repair the existing covering.

Another object of the invention is the provision of a foldable door or partition so mounted and swung upon upper and lower hinges that the door, in either its open or closed, or any intermediate position, may readily be adjusted and positively held in any desired angular position, either folded, extended or partially extended.

A further object of the invention is the provision of a sound insulating and sound absorbing door adapted to efficiently take the place of the conventional wooden doors of the prior art to close the customary doorways extending from room to room.

Another object of the invention is the provision in the working parts of the frame mechanism of an improved arrangement of extensible linkages capable of operating with the highest amount of efficiency and manufactured from standard parts, thereby decreasing the cost of production of the improved structure to a minimum.

It is a further object of the invention to provide in a folding door of the type specified, improved means for aligning the extended edge of the door, and for assuring the uniform extension of the door.

Another object is the provision of an improved framework for extensible doors or closures of the class described which is self-supporting, that is, adapted to be supported at one side of the framework and to be carried from that side without the necessity for providing tracks, guides, supporting rollers, or the like, as distinguished from the devices of the prior art in which it has been necessary to provide auxiliary means of support at the outer end of the door.

Other objects and advantages of the invention will be apparent from the following description and from the accompanying drawings, in which similar reference characters indicate similar parts throughout the several views.

Referring to the drawings, of which there are six sheets,

Fig. 4 is a plan view of one of the foldable doors of the invention;

Fig. 5 is an enlarged vertical sectional view taken on the line 5—5 of Fig. 4, showing how the outer covering is mounted upon the framework;

Fig. 6 is a fragmentary plan view taken on the line 6—6 of Fig. 2, illustrating how the exterior covering is secured to the framework;

Fig. 7 is a plan sectional view on the line 7—7 of Fig. 2, showing how the cross braces are attached to a main frame member;

Fig. 8 is an enlarged elevational view of the parts shown in Fig. 7;

Fig. 9 is a plan sectional view through the outer portion of the main frame, taken on the line 9—9 of Fig. 2 and illustrating how the sliding cross brace is supported;

Fig. 10 is an enlarged side elevational view of the parts shown in Fig. 9;

Fig. 11 is a plan sectional view on the line 11—11 of Fig. 2, illustrating how one of the cross braces is pivotally secured to the main frame;

Fig. 12 is a plan sectional view taken on the line 12—12 of Fig. 2 directly above the frame aligning means;

Fig. 13 is an enlarged vertical sectional view through a portion of one of the upright frames, illustrating the aligning mechanism;

Fig. 14 is a plan sectional view on the line 14—14 of Fig. 13;

Fig. 15 is also a plan sectional view taken on the line 15—15 of Fig. 13;

Fig. 16 is a fragmentary perspective view of a portion of the foldable door with the outer covering removed, taken generally at the lower hinge; and Fig. 17 is a detail sectional view through the door stop mechanism and is taken on the line 17—17 of Fig. 16.

Figure 1:
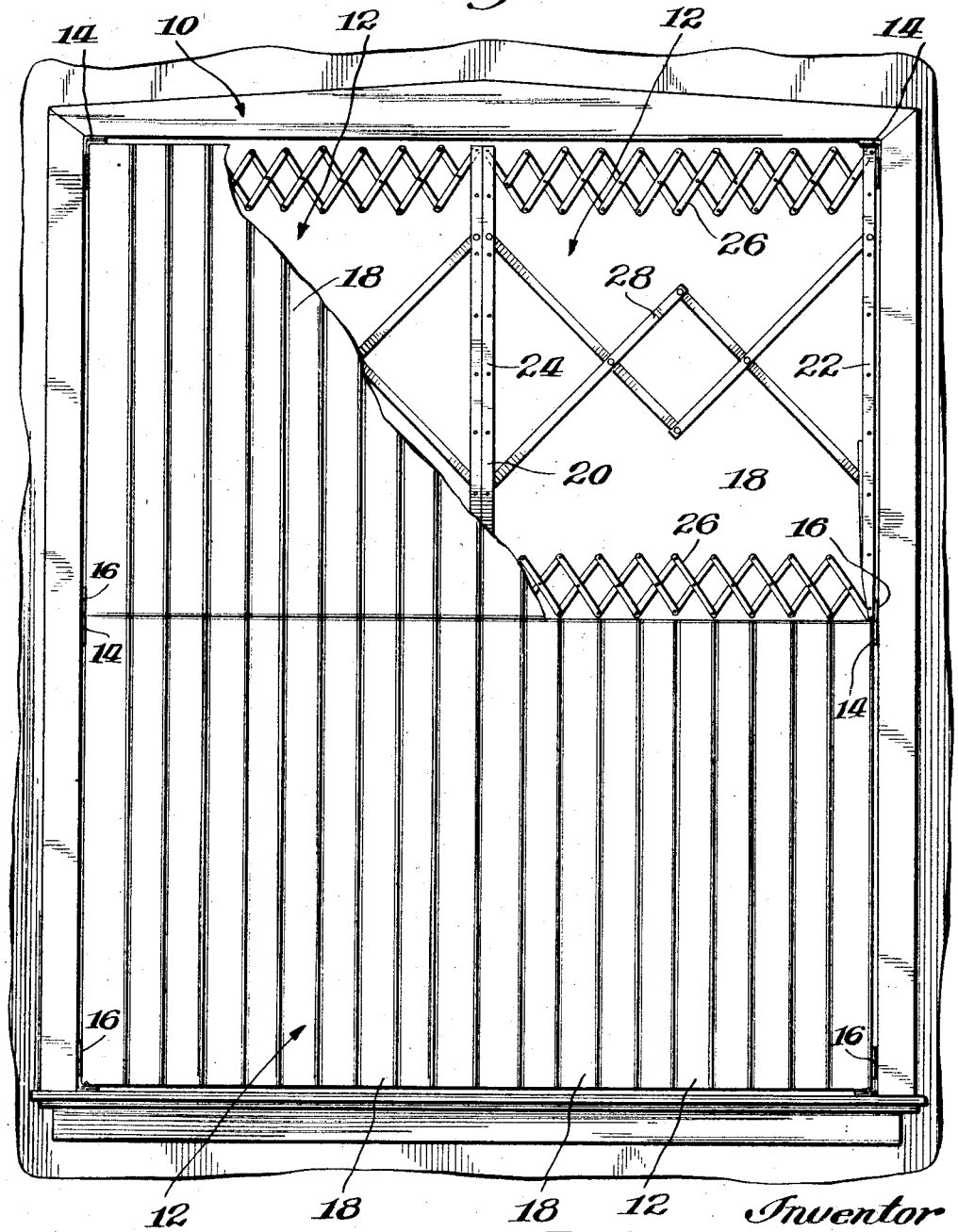
Fig. 1 is a side elevational view of a set of four foldable doors mounted in a window frame with portions of the exterior covering of two of the doors broken away to more clearly show the framework.

Referring now more particularly to the drawings, in Fig. 1, I have shown a window frame 10 preferably rectangular in shape, in which are hingedly mounted a plurality of window closures 12 supported upon upper hinges 14 and lower hinges 16.

Each of the window closures 12 may include generally an outer covering 18 which may be mounted on either or both sides of the framework 20.

The framework of the window closure may comprise the back lateral frame 22 and the forward lateral frame 24 connected at their upper and lower ends by a pair of extensible linkages 26. A stronger supporting linkage 28 is positioned between the upper and lower extensible members for providing the necessary rigidity and support to the frame.

The linkage 28 may be of the type shown in Fig. 1 or any other multiplicity of links pivoted at their mid points or at similar points to form pivoted parallelogram linkage, depending upon the width of the closure and the rigidity with which it is required to support the framework. The window closures shown in Fig. 1 may be conveniently employed to shade portions of the room from brilliant sunlight and they may be swung in a partially extended or entirely extended position or swung laterally a portion of the way open, as desired, to allow proper ventilation of the room while still shading portions desired against sunlight.

Figure 2:
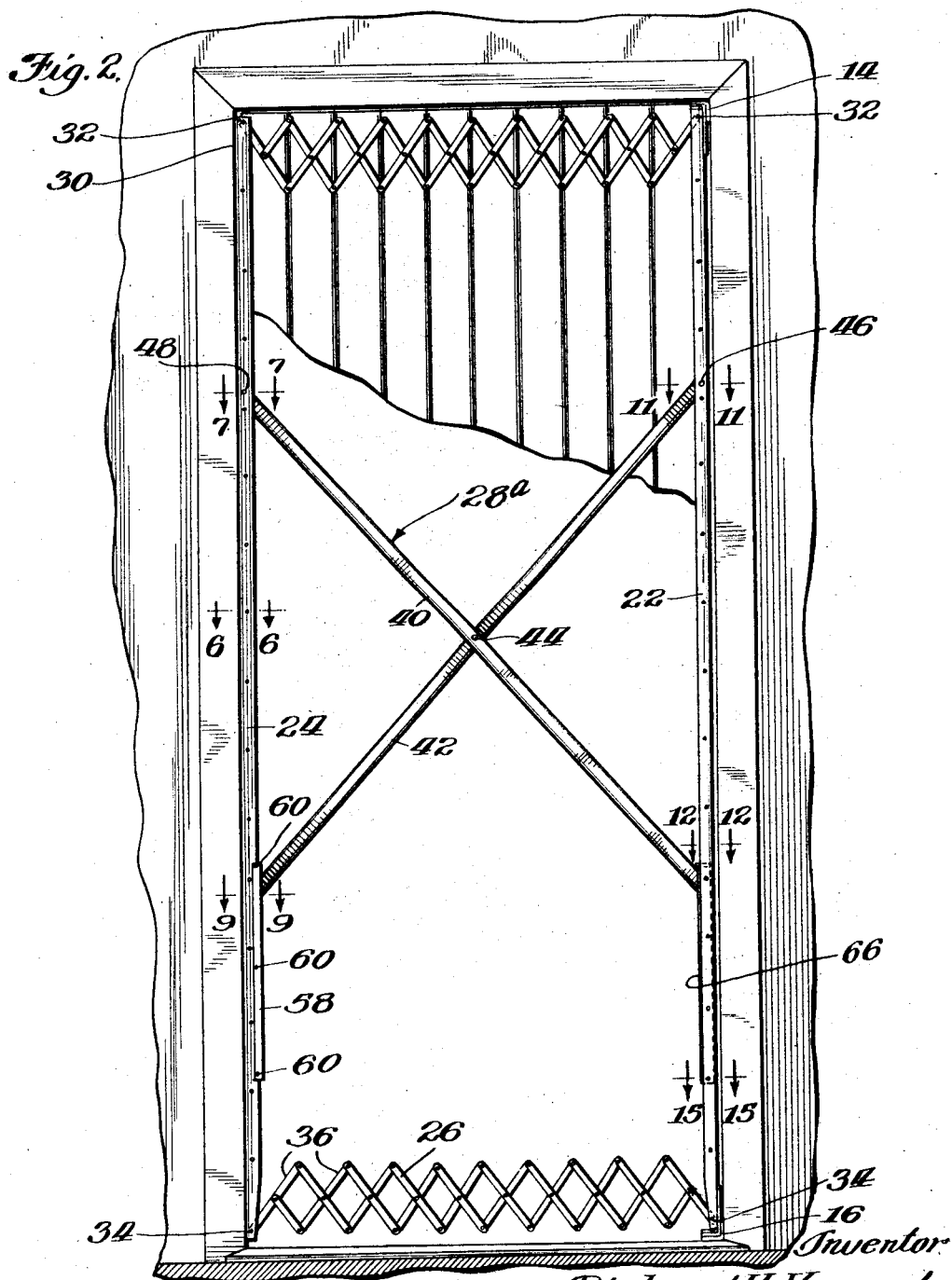
Fig. 2 is a side elevational view of one of the foldable doors of the invention, mounted in a doorway to form a closure therefor, the exterior covering being removed on the front to more clearly show the framework of the door.

Referring to Fig. 2, wherein a closure similar to the closure 12 of Fig. 1 is shown, it will be noted that a slightly different linkage 28a is provided, due to the fact that the doorway opening 30, in which the closure 12 of Fig. 2 is shown, is higher than the opening closed by each closure member 12 in Fig. 1. Since the parts are generally similar and in principle are the same, a detailed description will be provided of the parts shown in Fig. 2.

The rear frame 22 and the front frame 24 may each be of a U cross-section and the linkages 26 may be suitably pivoted upon pivot pins 32 at the upper ends of the two frame members and pivot pins 34 near the lower ends of the two frame members. Linkages 26 may consist of a plurality of parallel links 36 pivotally secured together at their ends and mid points by a plurality of transverse links 38. In order to place all of the links 36 in the same plane the links 38 are placed upon each side of the link 36 at their pivots so that the two sets of links 38 will also be in the same plane, insuring a smoothly operating and neatly folding linkage arrangement.

The supporting linkage 28 may consist of flattened tubular members 40 and 42 pivotally connected at their mid point on the pin 44 and pivotally connected to the back frame upon the pivot pin 46 and to the front frame upon the pivot pin 48 at their upper ends. As most clearly shown in Figs. 7 and 8, there are two of the members 40 which are separated upon the pin 48 by suitable washers and also are provided with spacer washers which separate them from the walls of the U-shaped front frame member 24. The members 40 are subject to the strain and stress of the extended weight and for this reason two of these members are provided.

Figure 3:
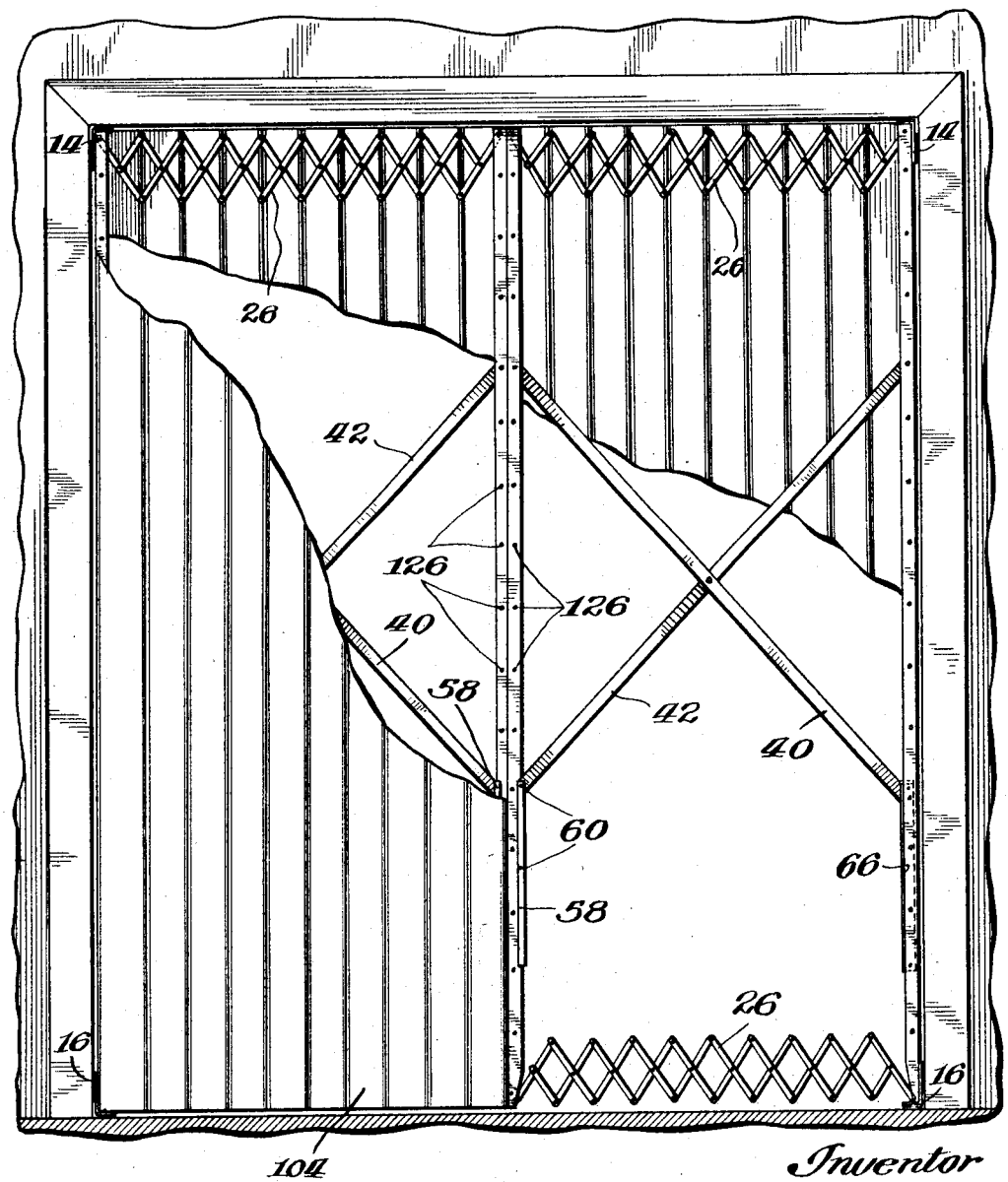
Fig. 3 is a side elevational view similar to Fig. 2, showing a pair of the foldable doors of the invention mounted in a double doorway and being hinged at opposite sides of the doorway.

Referring to Fig. 3, it will be noted that the right hand curtain is supported from hinges carried by the right hand side of the door frame. The supporting linkage which is formed of the members 40 and 42 is adapted to support the frame member at the center of the door, the extensible members 26 and the weight of the door covering without the necessity for any rollers or guides. The supporting linkage comprising the members 40 and 42 are, therefore, subjected to strains which were not present in the linkages of the prior art. The member 40 acts as a cantilever placing the upper end of the member 42 in tension on account of the downward pull of the unsupported edge of the door. Therefore, the brace 40 comprises a pair of tubular members adapted to withstand the forces to which a cantilever is subjected. The member 42 is subjected to tension at its upper end and to some compression at its lower end, or in some cases it may be subjected to tension at its lower end, depending upon the arrangement of the forces acting upon the door, but the member 42, not being subjected to as much force as the member 40, only one tubular member 42 is required.

Due to the fact that the frame member 42 crosses the frame members 40 at their center the members 40 are spread sufficiently to provide a space through which the member 42 may pass, allowing for neatness in appearance and compactness in assembly. The single tubular member 42 is pivotally mounted upon the pin 46 in the back frame member 20 and is properly centered between the walls of the frame member 20 by a plurality of spacer washers 50. The lower end of frame member 42 carries a pair of fiber or other suitable rollers 52 positioned upon a shaft 54 which extends through the lower end of frame member 42. The rollers are suitably spaced from the frame member 42 by washers 56.

A pair of angle shaped track members 58 of a suitable length are secured to the front frame 24 by suitable screw members 60 and form a guide and track means upon which the rollers 52 may travel as the foldable door is extended or collapsed.

Referring now to Figs. 12, 13, 14 and 15, the manner in which the lower end of the frame members 40 is attached will now be described.

The lower ends of the members are pivotally secured upon a pin 62 which extends through an elongated opening 64 in the adjustable member 66 which is positioned between the two frame members 40 and serves to space them apart.

The adjusting member 66 is pivotally secured near its lower end upon a stud 68, being positioned centrally between the extended portions of the frame member 22 by a pair of spacers 70. The adjusting member 66 is supported near its upper end upon a stud 72 which extends through an elongated opening 74 in the upper end of the member 66, this end being also positioned centrally of the member 22 by the spacers 76. The member 66 at its extreme upper end carries a yoke or bracket portion 78 which is secured thereto by a rivet 80 and is formed with extending arms 82. A pair of set screws 84 are threadedly mounted in the arms 82 of the yoke 78 and are adapted to be adjusted toward or from the back wall of the frame member 22, as desired. The purpose of this adjustment is to move the member 66 toward or from the rear wall of the frame member 22 to line up the forward edge of the frame 24 with an opening or with the front edge of an adjacent foldable door.

If the foldable door is moved to an extended position and if it is found that the upper end has not been extended so far as the lower end, it may be moved outwardly by screwing down upon the screw members 84 and moving the adjusting member 66 outwardly away from the wall of the frame member 22 until the outer edge of the frame member 24 presents a vertical line.

The hinge construction and operation shown in Figs. 16 and 17 will now be described.

Inasmuch as the upper hinge members are identical with the lower hinge members only one, which is a lower hinge, has been shown in the drawings. A stationary hinge plate 86 is shown securely attached to the wall or doorsill by means of the screw members 88 and is provided with an outwardly extending flange 90.

An L-shaped plate 92 is securely fastened to the back side of the main frame member 20 with its short leg extending forward below the end of the frame member. A movable hinge plate 94 is secured to this L-shaped plate and is pivotally mounted upon the hinge pin 96 which also extends through the flange 90. As thus described, the door is hingedly positioned upon the flange 90 of the stationary hinge plate 86 and may be swung around the hinge pin 96 to open or close the doorway or window in which the closure member is positioned.

Means for holding the closure member in any open or partially opened position are provided and comprise a friction bearing element 98 enclosed within a housing 100 which is screw-threadedly mounted in the plate 94. A spring 102 of a sufficient tension to hold the closure member in any placed position is enclosed in the housing 100 behind the friction member 98. Thus it will be seen that by the means described the closure member may be swung open in an extended position and held in any desired open position, and it is of course obvious that the closure member may be swung around to any desired open position while in a collapsed condition. For example, the closure member may be collapsed and then swung at right-angles against the face of the wall to provide a larger opening in the doorway than would be possible with the closure member merely collapsed.

It will be noted that the member 94 supports the frame work of the door at one side of the pivot 96. The member 94 is long enough so that there is room for the folds of the door covering between the door frame and the extensible framework when the member 94 is moved clockwise through a range of 90 degrees in Fig. 16. The member 94 thus spaces the extensible frame sufficiently from its pivotal support to make room for the folds of the curtain, and it permits the curtain to be swung out of the doorway to better advantage.

The exterior covering or envelope will now be described. This covering may comprise any suitable material such as tapestry, velour, leather, imitation leather, or any other suitable material used for covering or tapestries. In the drawings leather has been shown to illustrate the use of one of these materials and a leather covering 104 has been provided on either side of the framework.

Referring to Fig. 5, this is an enlarged view taken through the upper edge or the lower edge of the curtain showing the mode of its attachment to the extensible linkages.

The covering 104 is adapted to be folded back at 106 along its upper and lower edges and is provided at these points with a separate fastening strip 108. Metallic eyelets 110 of a suitable type are secured to the fastening strip 108 at predetermined intervals and the fastening strip is secured by means of screw members 112 which extend through the eyelets to the pivots 114 of the toggle members 26, the pivots being formed with suitable enlarged ends having tapped openings 112a therein to screw-threadedly engage the screw members 112. The fastening strip 108 may be secured in this manner to each of the upper rows of pivot pins of the upper toggle 26 and to each of the lower rows of pivot pins of the lower toggle 26, in this manner insuring a positive and exact fastening at both the upper and lower ends and, due to the tension and tautness of the covering, forming at these points a crease for the covering to fold back upon itself when the closure member is collapsed, thereby determining the lines of fold for the covering.

After the covering has been secured upon the frame it may be advisable to prevent unwarranted access to the screw members 112 and this may be done by securely sewing the upper edge of the covering 104 and the upper edge of the strip 108 together by means of the thread 116.

The linkages 26 are primarily for the purpose of providing a uniformly extensible frame work adapted to support the curtain in such a manner that it is folded uniformly. Since these linkages do not constitute the primary supporting linkage for the curtain frame, they may be made much smaller with shorter links than could otherwise be used, and the folds of the curtain may be made much smaller than would otherwise be possible so as to provide a neater curtain and a curtain which is much more narrow when folded.

The covering 104 is fastened to the frame members 20 and 22 in a manner generally similar to the manner in which the upper and lower edges of the covering are fastened. A similar vertical fastening strip 118 is sewed or otherwise secured in the inside of covering 104 along its vertical edge and carries a plurality of metallic eyelets 120 spaced at predetermined intervals along its entire length. The vertical fastening strip 118 is provided with a beaded or corded edge 122 to provide a more sightly edge finish. Screw members 124 extend through the eyelets 120 and are screw-threadedly engaged in suitable openings 126 in the frame members 22 and 24.

From the foregoing description it will be seen that a covering may be attached to the framework of the closure member in an expeditious and efficient manner. It will be further apparent that no unsightly metallic buttons or screw heads or studs are visible or protruding above the surface of the covering 104.

Means for enclosing the edges of the frame members 20 and 22 are provided and comprise a strip of covering material 128 which may have suitable openings cut therein and then bent to form a U shape and fastened by the screw members 124. By the use of this edge covering 128 the entire framework is hidden from view and a foldable door of very attractive appearance is produced.

It will be evident from the foregoing that a foldable door of an extremely compact, yet light and highly efficient quality has been provided, and due to the extreme simplicity of operation and ease with which the door may be extended or collapsed or swung about its hinges, a child can easily secure access to or egress from rooms provided with my improved closure members.

It will thus be observed that I have provided an improved foldable curtain, the extensible frame of which comprises a primary or supporting linkage as well as the extensible linkages for supporting the covering. By means of this primary linkage the foldable curtain may be supported solely from one of its vertical edges, and it is absolutely unnecessary to provide any form of roller or guide for supporting the other or free edge of the curtain.

While I have illustrated a preferred embodiment of my invention, many modifications may be made without departing from the spirit of the invention, and I do not wish to be limited to the precise details of construction set forth, but rather, what I desire and wish to secure by Letters Patent of the United States is:

1. In a foldable door, the combination of a pair of upright frame members, a hinge member at the upper and lower ends of one of said frame members, a collapsible link mechanism connecting the upper ends and the lower ends of said members, a collapsible brace element intermediate the ends of said frame members, means associated with said brace element for aligning the extended edge of said door, and a flexible covering material enclosing said frame members and attached at the upper pivots of said upper link mechanism and at the lower pivots of said lower link mechanism, and along each upright frame member.

2. In a foldable door, the combination of a pair of upright frame members, a hinge member at the upper and lower ends of one of said frame members, a collapsible link mechanism connecting the upper ends of said frame members, a similar link mechanism connecting the lower ends of said members, a collapsible cross brace member having one end pivotally connected on each frame member, the opposite ends of said brace slidable in guides in said frame members, slide means in said frame members, one of said slide means adjustable to align the outer frame member, and a flexible covering material enclosing said frame member and attached to the upper pivots of said upper link mechanism, to the lower pivots of said lower link mechanism, and along each frame member by concealed attaching means.

3. A framework for a foldable door comprising a pair of U-shaped upright frame members, a collapsible link mechanism connecting the upper ends of said frame members, a similar link mechanism connecting the lower ends of said frame members, a collapsible cross brace element having the upper ends of the brace pivotally connected to each frame member, the lower ends of said brace slidable in guides in said frame members, slide means in said frame members, and means associated with one of said slide means for adjusting the outer frame member inwardly or outwardly in an extended position.

4. A frame for a collapsible door comprising a pair of U-shaped upright frame members positioned facing each other, extensible supporting means secured between the upper ends of the framework and between the lower ends of the framework, a collapsible cross brace element positioned intermediate the ends of the frame members, the upper ends of the brace element pivotally secured in the U-shaped frame members, the lower end of one brace element having rollers for engaging a track in one of said frame members and the other brace member adapted to slide in a guide in the other frame member, a guide in said frame member, and means associated with said guide for adjusting said guide toward or from said frame member.

5. A collapsible door including a frame comprising a pair of U-shaped upright frame members positioned facing each other, extensible supporting means secured between the upper ends of the framework and between the lower ends of the framework, a collapsible cross brace element positioned intermediate the ends of the frame members, the upper ends of the brace element pivotally secured in the U-shaped frame members, the lower end of one brace element having rollers for engaging a track in one of said frame members and the other brace member adapted to slide in a guide in the other frame member, a guide in said frame member, means associated with said guide for adjusting said guide toward or from said frame member, and a flexible covering material enclosing said frame members and attached at the upper ends of said upper toggle link mechanism, at the lower ends of said lower toggle link mechanism, and along each frame member by concealed attaching means.

6. In an extensible door framework, the combination of a pair of rigid lateral frame members with a pair of extensible frame members, said extensible frame members joining the ends of said lateral frame members to form an extensible framework, and a supporting linkage for said framework and for connecting said lateral frame members at intermediate points between said extensible frame members and adapted to support the weight of said framework from one edge of said framework, comprising a pair of supporting and bracing members pivotally secured together and pivotally mounted on said lateral frame members, and guide means for slidably and pivotally mounting the opposite ends of said supporting and bracing members in said lateral frame members.

7. In an extensible door framework, the combination of a pair of rigid lateral frame members with a pair of extensible frame members, said extensible frame members joining the ends of said lateral frame members to form an extensible framework, and a supporting linkage for said framework and for connecting said lateral frame members at intermediate points between said extensible frame members and adapted to support the weight of said framework from one edge of said framework, comprising a pair of supporting and bracing members pivotally secured together and pivotally mounted on said lateral frame members, guide means for slidably and pivotally mounting the opposite ends of said supporting and bracing members in said lateral frame members, and means for adjusting one of said guide means to assure the parallelism of said lateral frame members.

8. In an extensible door, the combination of a pair of rigid lateral frame members with a pair of extensible frame members, said extensible frame members joining the ends of said lateral frame members to form an extensible framework, a supporting linkage for said framework and for connecting said lateral frame members at intermediate points between said extensible frame members and adapted to support the weight of said framework from one edge of said framework, and an extensible covering for said framework comprising an inner comparatively heavy covering member tensioned between uniformly spaced points of support on said extensible frame members and an outer decorative member tensioned between uniformly spaced points of support around its edges.

9. In a foldable curtain, the combination of a supporting frame with the curtain carried by said supporting frame from one of its edges, said curtain comprising a pair of vertical frame members and extensible linkages at each end of said vertical frame members joining said vertical frame members together to form a substantially rectangular extensible framework, a covering for said framework adapted to be uniformly extended or folded by said framework, and a primary supporting linkage intermediate said extensible linkages, said primary supporting linkage being adapted to constitute the support of the curtain from the supported edge of the curtain, thereby eliminating the necessity for supporting devices at the free edge of the curtain.

10. In a foldable curtain, the combination of a supporting frame with the curtain carried by said supporting frame from one of its edges, said curtain comprising a pair of vertical frame members and extensible linkages at each end of said vertical frame members joining said vertical frame members together to form a substantially rectangular extensible framework, a covering for said framework adapted to be uniformly extended or folded by said framework, a primary supporting linkage intermediate said extensible linkages, said primary supporting linkage being adapted to constitute the support of the curtain from the supported edge of the curtain, thereby eliminating the necessity for supporting devices at the free edge of the curtain, and a friction device carried by one of the hinges of said curtain and adapted to retain said curtain in predetermined pivotal position with respect to said door frame.

11. In a foldable curtain, the combination of an extensible framework including a pair of rigid end frame members, said end frame members being connected at their ends by uniformly extensible linkages, a foldable covering carried by said framework and adapted to be uniformly extended or folded thereby, said covering being secured at the bottom and top of said curtain to said extensible linkages, securing devices comprising an auxiliary strip of material secured to the rear side of said curtain, and means for fastening said auxiliary strip to said extensible framework, said curtain extending over and concealing said securing devices, thereby presenting a covering of uniform appearance.

12. In a foldable curtain, the combination of an extensible framework including a pair of rigid end frame members, said end frame members being connected at their ends by uniformly extensible linkages, a foldable covering carried by said framework and adapted to be uniformly extended or folded thereby, said covering being secured at the bottom and top of said curtain to said extensible linkages, securing devices comprising an auxiliary strip of material secured to the rear side of said curtain, and means for fastening said auxiliary strip to said extensible framework, said curtain extending over and concealing said securing devices, thereby presenting a covering of uniform appearance, said covering being also secured to said auxiliary strip beyond said securing devices, whereby unauthorized access to said securing devices is prevented.

13. In a foldable curtain, the combination of a supporting framework comprising a pair of vertically extending frame members, an extensible supporting linkage joining said vertically extending frame members and adapted to permit movement of said vertically extending frame members to any of the multiplicity of positions substantially parallel to each other, and means for connecting a portion of said supporting linkage and one of said frame members and adapted to facilitate the adjustment of the relations of said vertically extending frame members, whereby said vertically extending frame members may be brought into predetermined adjusted position.

14. In a foldable curtain, the combination of a supporting framework comprising a pair of vertically extending frame members, an extensible supporting linkage joining said vertically extending frame members and adapted to permit movement of said vertically extending frame members to any of the multiplicity of positions substantially parallel to each other, and means for connecting a portion of said supporting linkage and one of said frame members and adapted to facilitate the adjustment of the relations of said vertically extending frame members, whereby said vertically extending frame members may be brought into predetermined adjusted position, said connecting means comprising a guide for slidably supporting the end of one of the links of said supporting linkage, and said guide being adjustably and movably mounted with respect to one of said vertical frame members.

In witness whereof, I hereunto subscribe my name this 22nd day of October, 1930.

RICHARD H. VANSANT.